(12) United States Patent
Roy et al.

(10) Patent No.: US 11,305,511 B2
(45) Date of Patent: Apr. 19, 2022

(54) ENGINEERED FLOOR BOARD

(71) Applicant: BOA-FRANC, Saint-Georges (CA)

(72) Inventors: François Roy, Saint-Georges (CA);
Jonathan Cloutier, Beauceville (CA);
Vincent Tanguay, Lac-Etchemin (CA)

(73) Assignee: BOA-FRANC, S.E.N.C., Saint-Georges (CA)

( * ) Notice: Subject to any disclaimer, the term of this patent is extended or adjusted under 35 U.S.C. 154(b) by 695 days.

(21) Appl. No.: 13/966,396

(22) Filed: Aug. 14, 2013

(65) Prior Publication Data

US 2015/0050447 A1    Feb. 19, 2015

(51) Int. Cl.
| | |
|---|---|
| B32B 7/14 | (2006.01) |
| B32B 21/13 | (2006.01) |
| B32B 3/16 | (2006.01) |
| B27M 1/08 | (2006.01) |
| B27G 11/00 | (2006.01) |
| B27M 3/04 | (2006.01) |
| B27M 3/00 | (2006.01) |

(52) U.S. Cl.
CPC ............... *B32B 7/14* (2013.01); *B27G 11/00* (2013.01); *B27M 1/08* (2013.01); *B27M 3/0026* (2013.01); *B27M 3/0053* (2013.01); *B27M 3/04* (2013.01); *B32B 3/16* (2013.01); *B32B 21/13* (2013.01); *B32B 2307/734* (2013.01); *Y10T 156/17* (2015.01); *Y10T 428/24752* (2015.01)

(58) Field of Classification Search
CPC . B27G 11/00; B27M 1/08; B32B 3/16; Y10T 156/17; Y10T 428/24752
USPC .......................................................... 428/54
See application file for complete search history.

(56) References Cited

U.S. PATENT DOCUMENTS

| | | | | | |
|---|---|---|---|---|---|
| 2,199,938 | A | * | 5/1940 | Kloote ...................... | B64C 1/18 428/106 |
| 2,252,430 | A | * | 8/1941 | Klammt .................. | E04F 15/04 52/578 |
| 3,365,850 | A | * | 1/1968 | Marino ................... | E04F 15/04 428/511 |

(Continued)

FOREIGN PATENT DOCUMENTS

CA    2307362    11/2001

OTHER PUBLICATIONS

Gori, "Types of Wood", retrieved Jun. 2018 www.gori.com/about-wood/types-of-wood (Year: 2018).*

*Primary Examiner* — Frank J Vineis
*Assistant Examiner* — Laura B Figg
(74) *Attorney, Agent, or Firm* — Norton Rose Fulbright Canada LLP; Alexandre Daoust

(57) ABSTRACT

The present invention relates to a flexible sheet of wood strips for use in the fabrication of engineered floor boards or wood sheets and including the machine and method of manufacture of the flexible sheet of wood strips. The wood strips provide a wood floor which has much more stability than a solid wood plank which is much more affected by the temperature in a room and the moisture under the floor board. Also solid wood planks are much more expensive than engineered wood planks where only a very thin layer of quality wood material is utilized. The transverse wood strips are constructed of inferior wood material. Two or more treads of flexible material may be secured transversely to the wood strips to provide additional retention of the wood strips in the flexible sheet.

7 Claims, 11 Drawing Sheets

(56) References Cited

U.S. PATENT DOCUMENTS

| | | | | |
|---|---|---|---|---|
| 3,579,941 | A * | 5/1971 | Tibbals | E04F 15/022 52/384 |
| 4,801,483 | A * | 1/1989 | Beckerman | B29C 70/865 428/71 |
| 6,233,896 | B1 * | 5/2001 | Coup | E04B 5/12 156/304.3 |
| 2002/0108722 | A1 * | 8/2002 | Lee | B27L 5/00 160/236 |
| 2008/0047212 | A1 * | 2/2008 | Scoville | E04C 2/16 52/506.01 |
| 2008/0289277 | A1 * | 11/2008 | Stone | E04F 15/10 52/302.1 |
| 2009/0320402 | A1 * | 12/2009 | Schacht | E04F 15/02 52/588.1 |
| 2011/0179740 | A1 * | 7/2011 | Padmanabhan | B62D 25/2054 52/588.1 |

* cited by examiner

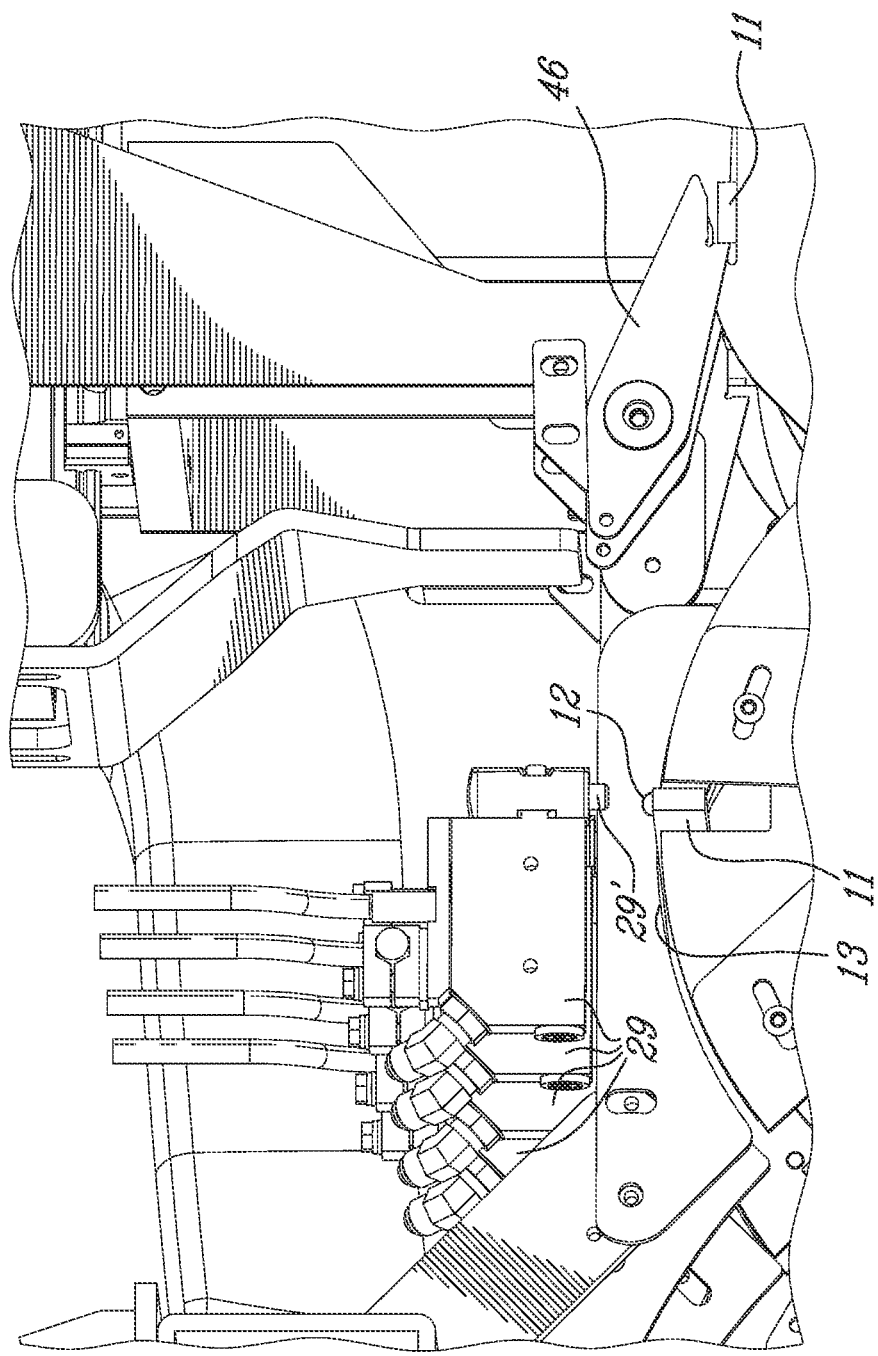

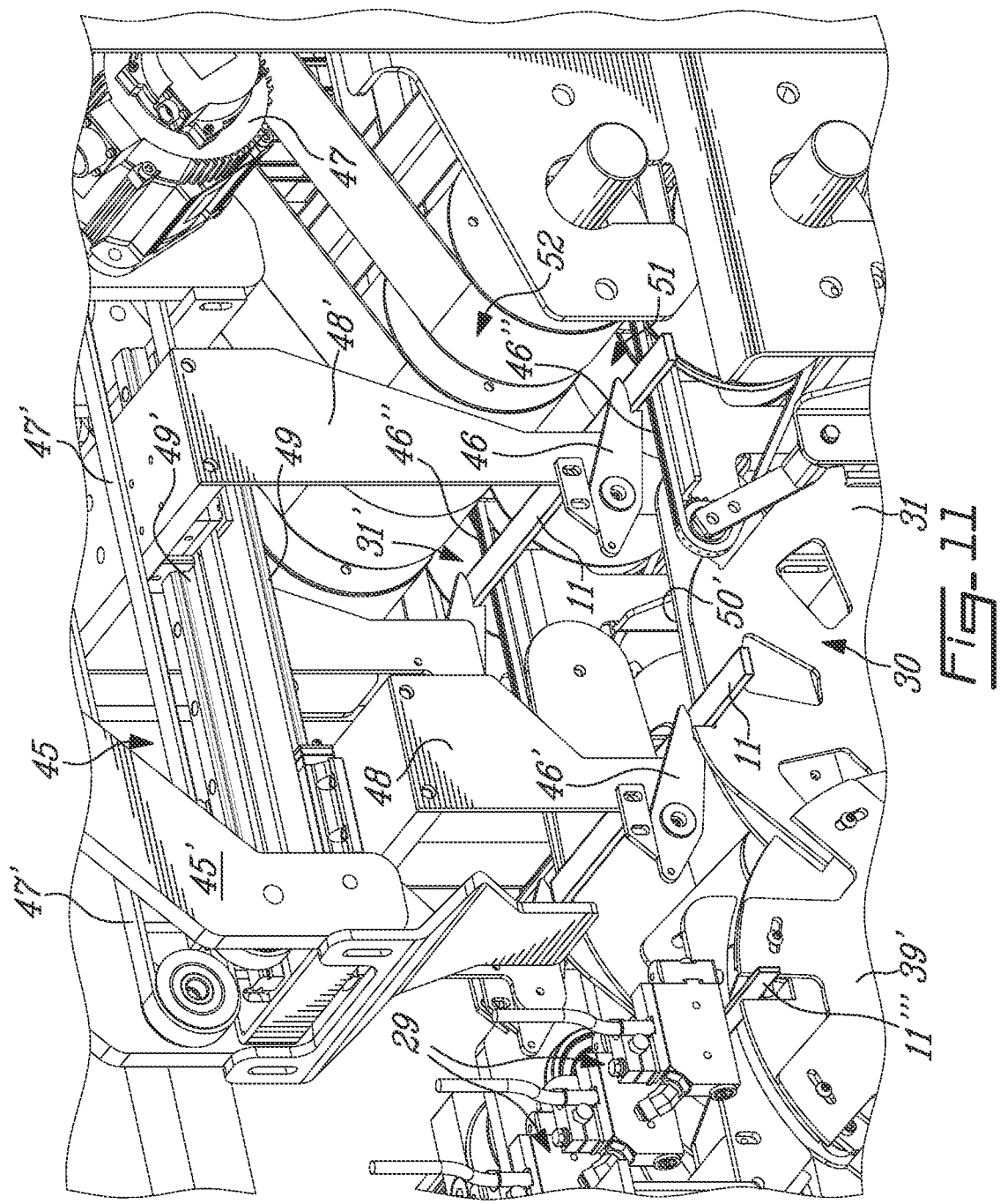

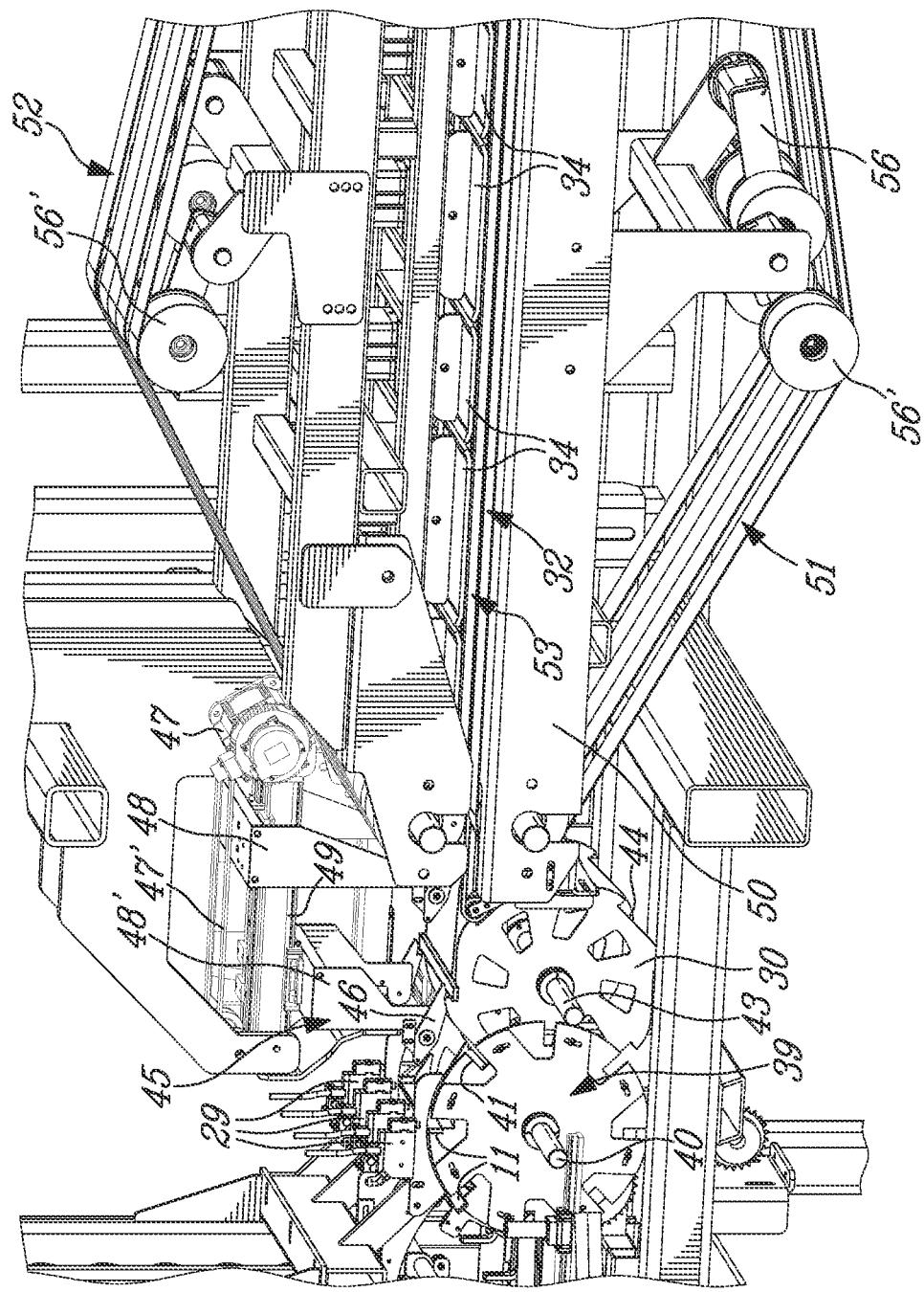

ENGINEERED FLOOR BOARD

TECHNICAL FIELD

The present invention relates generally to a flexible sheet of wood strips for use in the fabrication of engineered floor boards or wood sheets and including the machine and method of manufacture of the flexible sheet of wood strips.

BACKGROUND OF THE ART

It is known to construct engineered floor boards which comprise a top layer of a quality wood material and a bottom or core layer formed of transverse wood strips. Such a board is described, for example, in U.S. Pat. Nos. 5,736,227, 5,935,668 and 7,152,379. These wood strips are secured by glue to the top wood layer and extend transverse to the longitudinal axis of the top wood layer to provide longitudinal flexibility and dimensional stability to the board. US Publication No. 2004/0226243 discloses a two-ply flooring plank which has two layers of plies, with a bottom layer having a grain that runs generally transverse to the top layer to provide dimensional stability to the plank. The bottom layer is comprised by a number of strips secured to the bottom of the top layer and the strips are placed with gaps therebetween to allow flexibility of the flooring plank, which allows a flooring formed by such planks to more easily conform to irregularities in a sub-floor upon which the flooring plank is mounted.

It is common to fabricate the wood strips in a machine wherein the wood strips are held together by wires which are squeezed into slots which have been cut in a common surface of the wood strips when assembled together. Instead of using wires held in friction fit in slots, it is also known to secure the wood strips in side-by-side relationship by use of adhesive tapes or adhesive fiber layers. The wood strips may also be spaced-apart. However, with these methods, wood strips often become detached during manipulation and transportation. Also, because these wood strips are made from inferior wood products, some of the strips are susceptible to warping, particularly, when left in storage for lengthy time periods. This warping also causes additional problems in that the spacing between the boards becomes irregular. These problems result in additional costs in the fabrication of wood boards glued on such strips. The result is that the irregular spacing causes larger gaps between adjacent wood strips or no gap and this translates in a telegraphy of the wider gaps on the surface of the top layer which is very thin. It is desirable to have constant width grooves to provide longitudinal flexion and prevent telegraphy.

SUMMARY OF THE INVENTION

It is therefore a feature of the present invention to provide a flexible sheet of wood strips which substantially overcomes the above-mentioned disadvantages of the prior art.

Another feature of the present invention is to provide a machine for the fabrication of flexible sheets of wood strips for use in the fabrication of engineered floor boards.

Another feature of the present invention is to provide a method for the fabrication of flexible sheets of wood strips for use in the fabrication of engineered floor boards and which overcomes the disadvantage of the prior art.

According to the above features, from a broad aspect, the present invention provides a flexible sheet of wood strips. The wood strips are held together in side-by-side aligned spaced relationship by thermofusable glue droplets spaced-apart at predetermined locations along opposed side edges of the wood strips to interconnect the wood strips to one another between the opposed side edges and provide a flexible joint of substantially constant width between these opposed side edges.

According to another broad aspect of the present invention, there is provided a machine for the fabrication of flexible sheets of wood strips. The machine comprises feed means for supplying a plurality of wood strips to a transporter. The transporter has equidistantly spaced-apart wood strip engagement means for transporting and orienting the wood strips in spaced sequence adjacent a glue droplet applicator wherein two or more glue droplets are disposed at spaced-apart predetermined locations along a longitudinal side edge of each of the wood strips. Wood strip transfer means is provided for transferring the wood strips with the glue droplets to an input end of a conveyor where the wood strips are disposed side-by-side and interconnected in spaced relationship along opposed side edges thereof by the glue droplets. The conveyor has displacement means for engaging and conveying the wood strips interconnected in spaced relationship from opposed top and bottom surfaces and to squash any of the glue droplets projecting above the top and bottom surfaces of the wood strips interconnected by the glue droplets. Pressure means is associated with the conveyor to apply pressure across the wood strips from opposed top and bottom surfaces thereof to keep the wood strips flat. The glue droplets are dried and/or cooled sufficiently along the conveyor for the glue droplets to provide a mechanical retention force to retain the wood strips in interconnected spaced-apart relationship to form the flexible sheets of wood strips.

According to a still further broad aspect of the present invention, there is provided a method for the fabrication of flexible sheets of wood strips for use in the fabrication of engineered floor boards. The method comprises the steps of providing a plurality of elongated wood strips having similar dimensions. The wood strips are fed in a predetermined orientation to a transporter. The longitudinal side edge of the wood strips are oriented to receive two or more spaced-apart glue droplets from a glue droplet applicator which applies two or more spaced-apart glue droplets along the longitudinal side edge. The wood strips are then transferred with the glue droplets thereon to an input end of a conveyor where the wood strips are disposed side-by-side and interconnected in spaced relationship along opposed side edges thereof by the glue droplets. The wood strips are conveyed interconnected in spaced relationship from opposed top and bottom surfaces thereof. Pressure is applied across the wood strips to stabilize the wood strip and to squash any of the glue droplets projecting above the top and bottom surfaces of the wood strips. The conveyor is of sufficient length for the glue droplets to dry or cooling sufficiently to provide a mechanical retention force of the glue droplets to retain the wood strips in interconnected spaced-apart relationship to form sheets of the wood strips.

According to still further broad aspect of the present invention, there is provided a flexible engineered wood sheet comprising a top wood sheet fabricated from a quality wood material glued to a surface of a sheet of wood strips. The wood strips are held together in side-by-side aligned spaced relationship by thermofusable glue droplets spaced-apart at predetermined locations along opposed side edges of the wood strips to interconnect the wood strips to one another between the opposed side edges and also providing a flexible joint of substantially constant width between the opposed side edges. The wood strips have a longitudinal axis thereof disposed transverse to a grain orientation axis of the top wood sheet to provide flexibility of the top wood sheet along the grain orientation axis and dimensional stability to the flexible engineered wood sheet.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 10 is an enlarged perspective view showing the thermofusable glue droplet application station;

FIG. 11 is a further enlarged perspective view showing the transfer of the wood strips with their glue droplets into the assembly end of the press conveyor; and FIG. 12 is an enlarged perspective view showing the press conveyor.

DETAILED DESCRIPTION OF THE PREFERRED EMBODIMENTS

Figure 1:
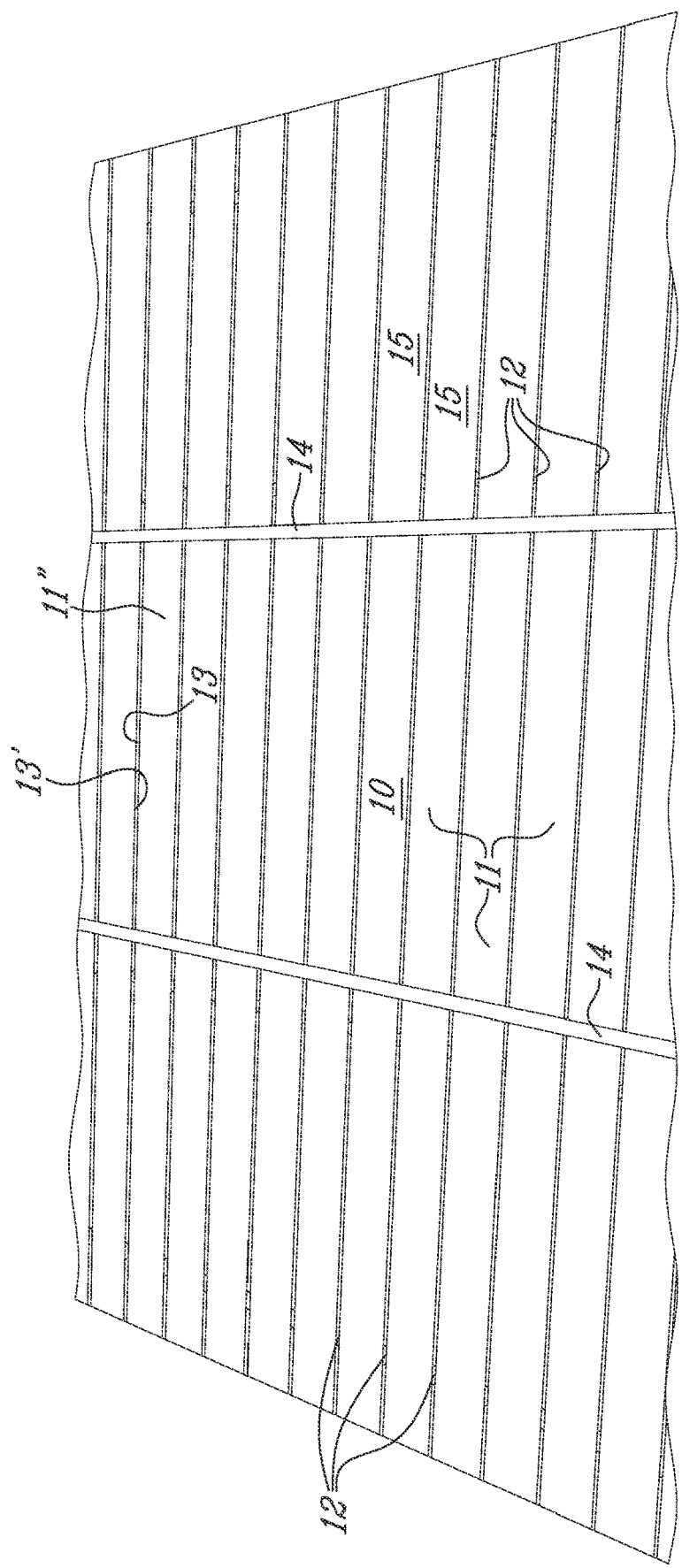
FIG. 1 is a fragmented top view of a flexible sheet of wood strips for use in the fabrication of engineered floor board and constructed in accordance with the present invention.
Figure 2:
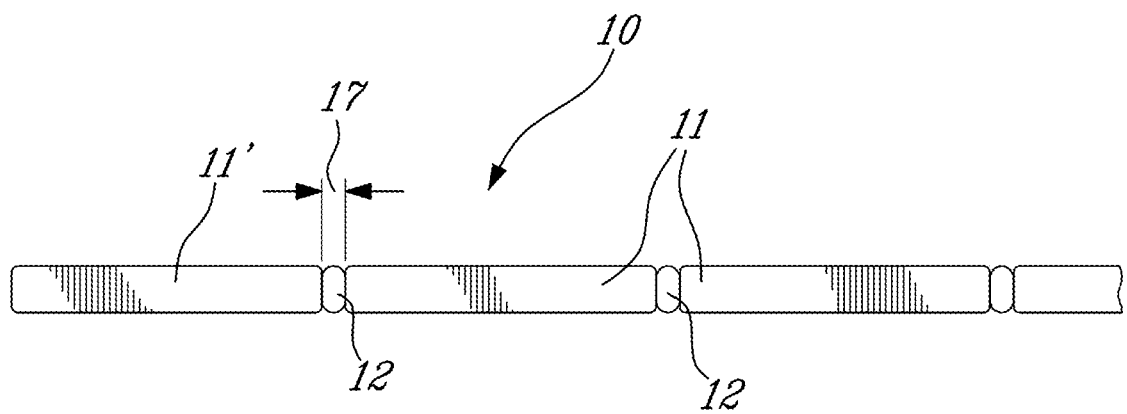
FIG. 2 is a transverse section view showing an end section of the flexible sheet of wood strips and wherein the end strip is wider than the adjacent wood strips.
Figure 3:
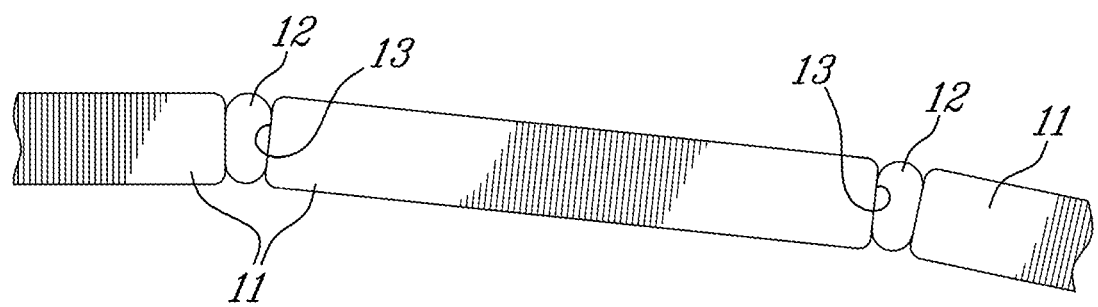
FIG. 3 is an enlarged cross-section view, partly fragmented, illustrating the position and utility of the interconnecting glue droplets.
Figure 4:
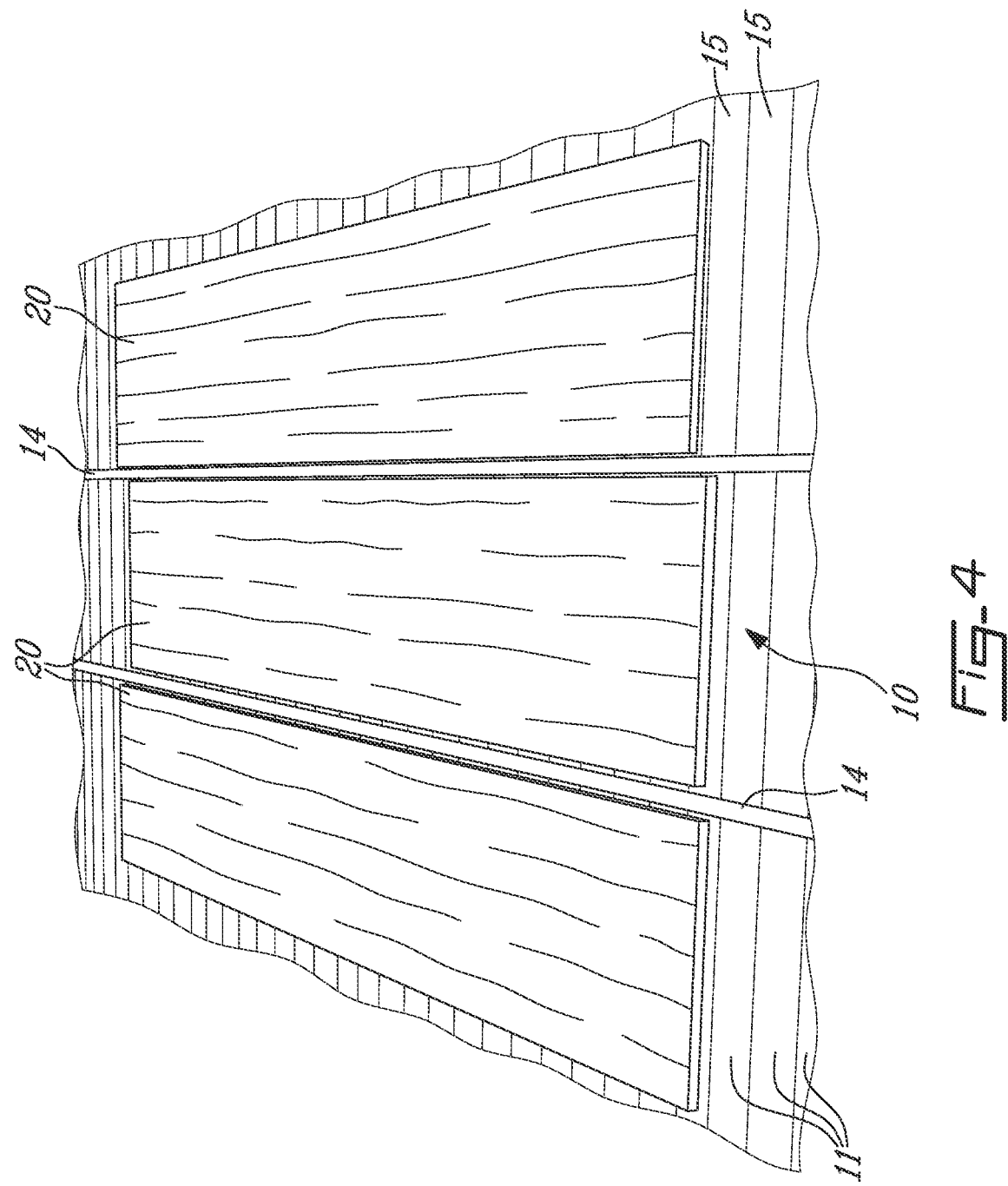
FIG. 4 is a fragmented section view illustrating an embodiment of how floor boards can be fabricated using the flexible sheet of wood strips of the present invention.
Figure 5:
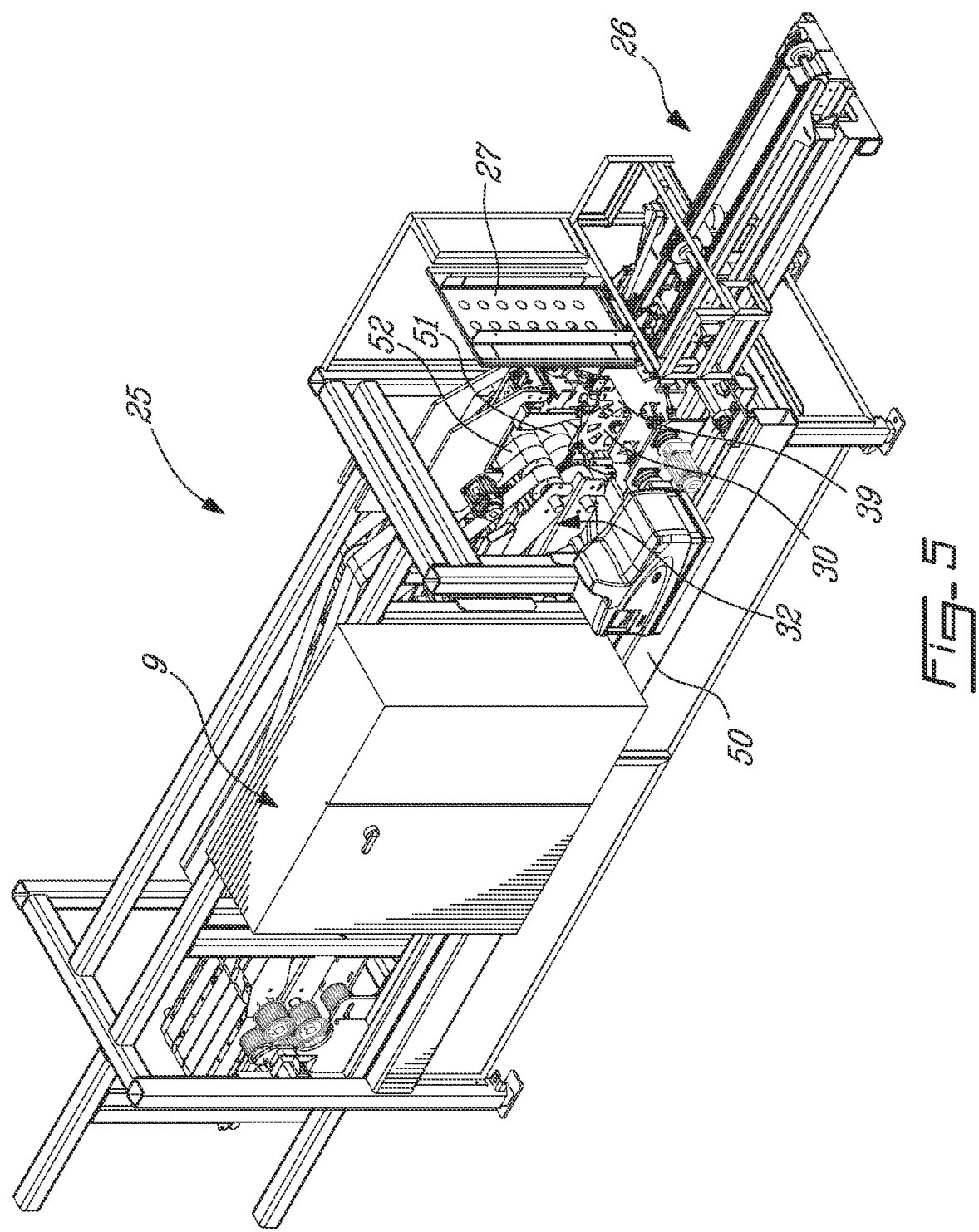
FIG. 5 is a perspective view of the machine for the fabrication of flexible sheets of wood strips in accordance with the present invention.

Referring to the drawings and more particularly to FIGS. 1 to 3 there is shown generally at 10 a flexible sheet of wood strips constructed in accordance with the present invention. The flexible sheet of wood strips comprises a plurality of wood strips 11 generally formed of resinous wood material which are held together in side-by-side aligned spaced relationship by thermofusable glue droplets 12 disposed spaced-apart at predetermined locations along opposed side edges 13 and 13' of adjacent wood strips 11 and 11'. The thermofusable glue droplets 12 interconnect the wood strips 11 to one another between the opposed side edges 13 and 13'. The droplets are of substantially identical volumes to provide a constant spacing 17 between the strips 11. As herein shown, retention means in the form of elongated treads 14 of flexible material are secured to a face 15 of the wood strips 11. Alternatively, a tread of flexible material may be connected to each of the wood strips by suitable means such as staples to provide interconnection of the wood strips to prevent their detachment from the glue droplets. As shown in FIG. 1, there are two of the treads 14 of flexible material disposed spaced-apart and these provide additional retention of the wood strips for the handling thereof such as when staking them in bundles and transporting them and manipulation at the assembly plant where floor boards are manufactured. The flexible treads 14 are formed of polyester fibers or other fibers impregnated in glue coatings disposed across the outer face 15 of the wood strips 11. As shown in FIG. 4, the polyester fiber treads 14 are positioned on the flexible sheet of wood strips at a location whereby to lie between the thin top quality wood sheets 20. A glue is applied on the top outer surface 15 of the wood strips 11 prior to the positioning of the thin quality wood sheets.

The wood strips 11 are elongated rectangular wood strips and define opposed flat top and bottom surfaces and transverse straight flat side edges 13. The glue droplets 12 as well as the flexible treads 14 maintain these wood strips spaced-apart with substantially constant spacing therebetween as determined by the glue droplets. The glue droplets also provide flexibility to the sheet 10 of wood strips. Although the wood strips are hereinshown of constant dimension, the sheet of wood strips may comprise wider wood strips at specific intervals whereby during the fabrication of engineered floor boards the wider wood strips would be positioned at the ends of the wood boards to provide sufficient material to rout grooves to provide an interconnection of the wood boards together in the fabrication of a wood floor.

With reference to FIG. 4, there is shown a manner in which floor boards can be fabricated using the flexible sheet of wood strips 10. The flexible sheet 10 of wood strips 11 is disposed flat on a support surface, such as a conveyor and thin sheets 20 of quality wood material are disposed thereover with the wood strips 11 extending transversely to the long axis and grain orientation of the sheets 20. As hereinshown the connecting polyester fiber treads 14 secured to the flexible sheet of wood strips lie between the top quality wood sheets 20 and are therefore not present behind the sheets 20. A glue is applied on the top outer surface 15 of the wood strips 11 prior to the positioning of the thin quality wood sheets 20.

Figure 6:
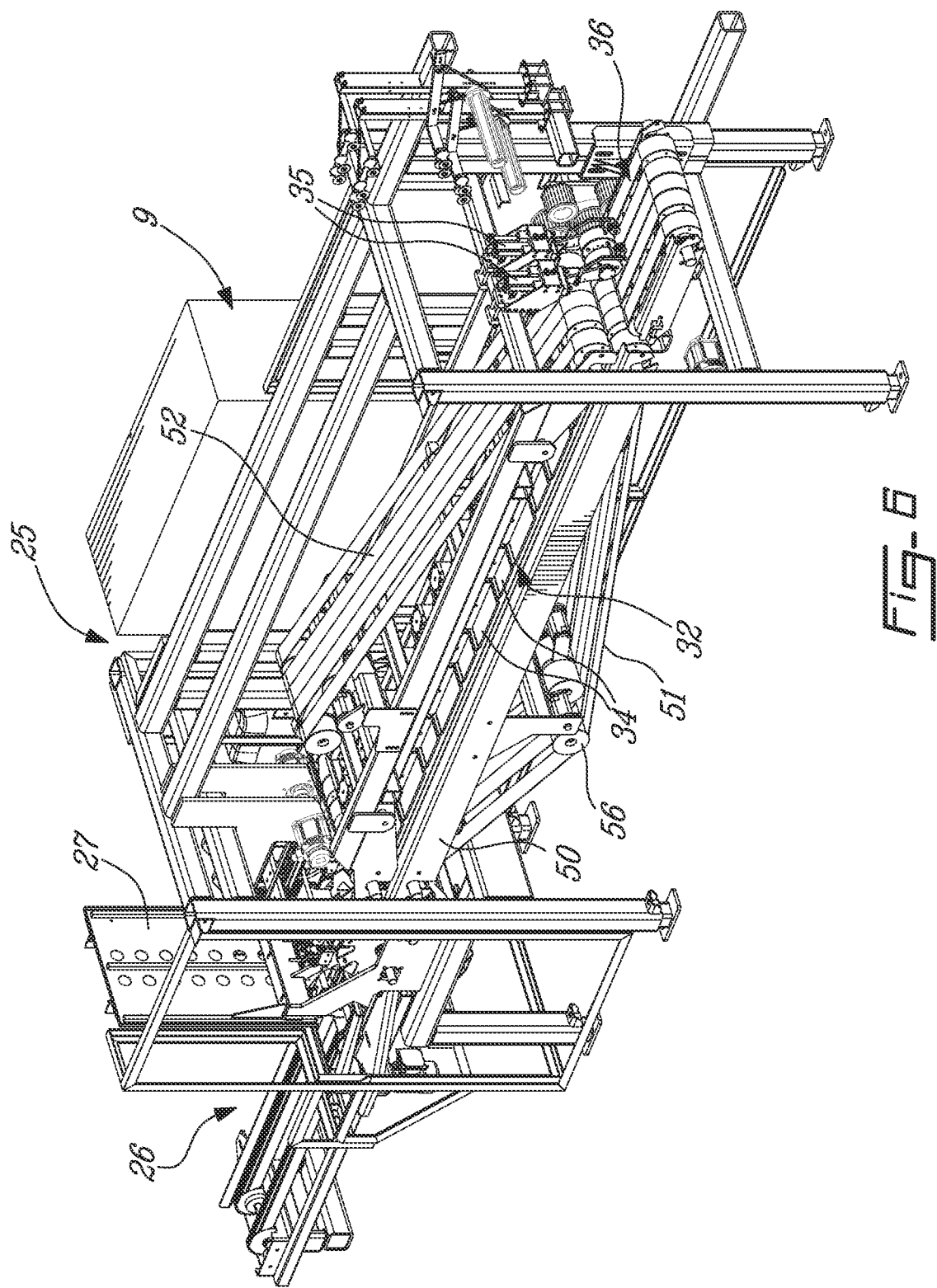
FIG. 6 is a perspective view similar to FIG. 5 but viewed from the opposed end of the machine.
Figure 7:
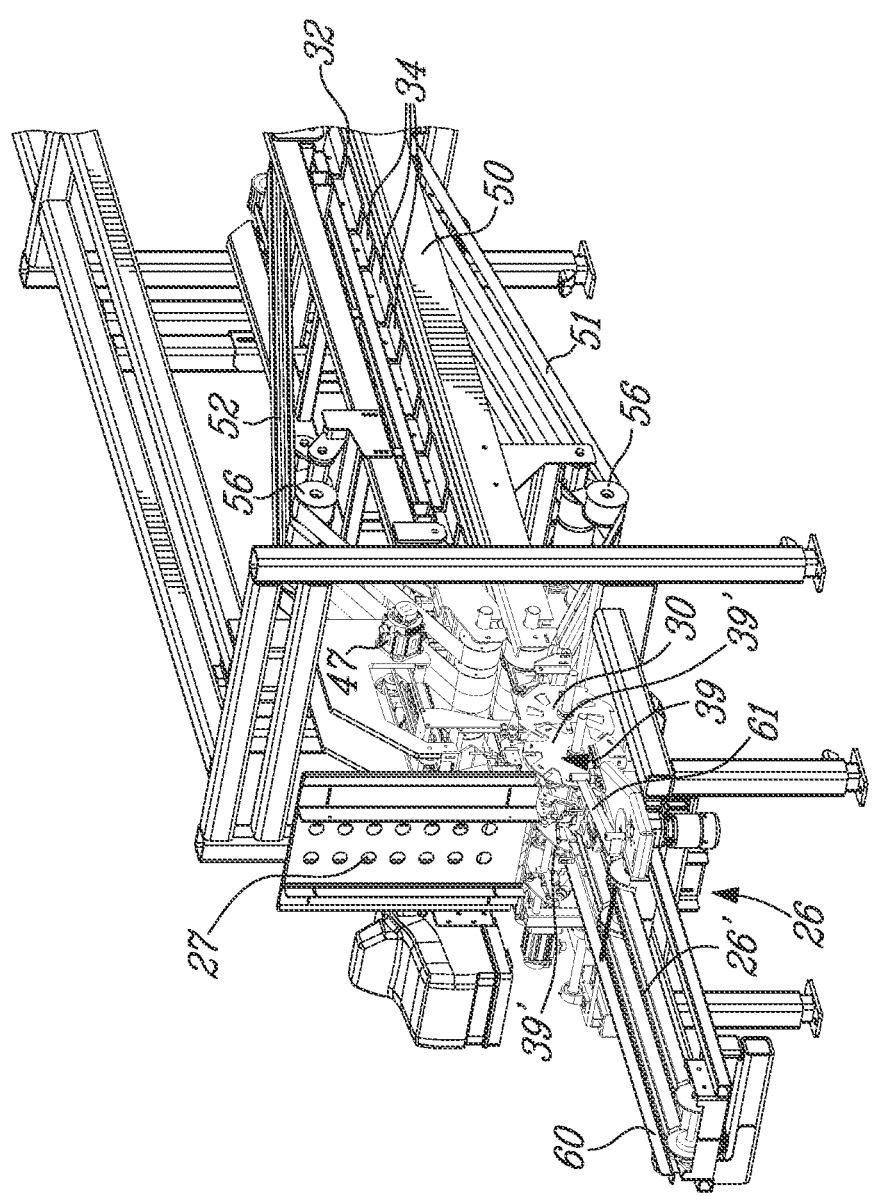
FIG. 7 is a fragmented perspective view showing the front end portion of the machine.

Referring now to FIGS. 5 to 12, there will be described the machine for the fabrication of the flexible sheets 10 of wood strips. The machine is generally identified by reference numeral 25 and comprises an inlet board strip feeding mechanism 26 to position and load a supply of wood strips one by one to a transporter mechanism 39. As shown in FIG. 7, the inlet feeding mechanism 26 is comprised of a feed conveyor 26' on which the strips are loaded. The feed conveyor 26' has aligning means to supply wood strips in aligned position to the transporter mechanism 39. This aligning means is comprised by a stationary side fence 60 secured on a loading side of the feed conveyor and a pivoting and reciprocating pusher fence 61 located on an opposed side for pushing wood strips placed on the feed end of the feed conveyer 26' with an end thereof abutting against the stationary side fence 60 wherein the wood strips are disposed in side-by-side parallel relationship on the feed conveyor 26'.

Figure 9:
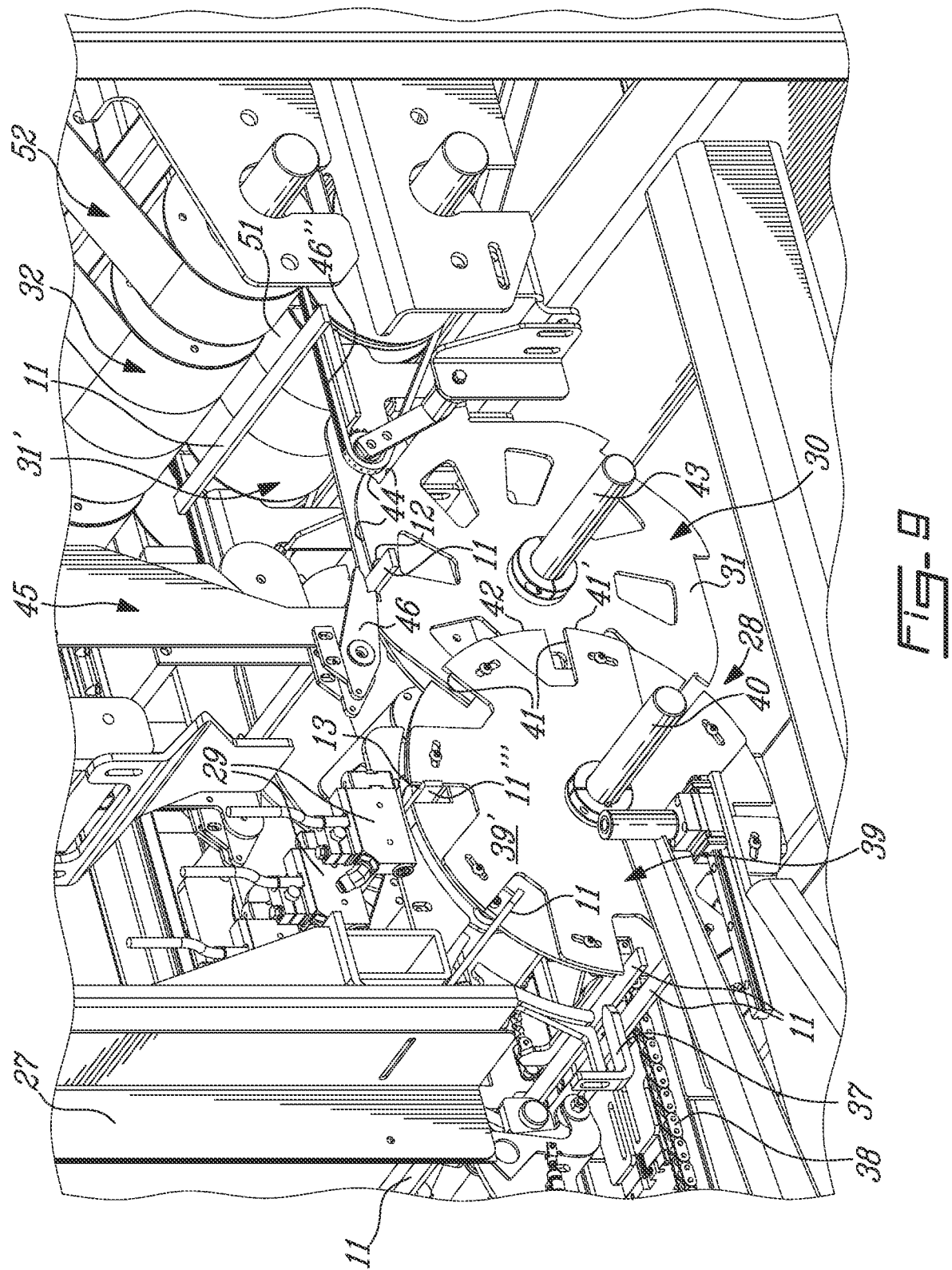
FIG. 9 is a fragmented perspective view showing the application of thermofusable glue droplets on the side edge of the boards and their transfer into the assembly and press section of the conveyor.

Referring to FIGS. 7 and 9 there is illustrated the construction of the transporter mechanism 39. As hereinshown, it is comprises of a pair of spaced-apart transport circular discs 39' secured to a common driven shaft or axle 40. The transport circular discs 39' have transversely aligned wood strip transport slots 41 radially disposed in equidistantly space relationship about the outer edge 41' of the circular discs and oriented outwardly. A controller 9 (see FIG. 6) controls the operation of an intermittent drive of the driven axle 40 and the operation of all moving parts of the machine.

Referring again to FIG. 9, it can be seen that the circular disc 39' supports the wood strips with a the longitudinal side edge 13 thereof oriented outwardly. The drive motor of the axle 40 is synchronized to stop every time the wood strips reach its vertical position as identified by the wood strip bearing reference numeral 11''' positioned under the glue droplet applicators 29. As hereinshown, there are four glue droplet applicators 29 to apply four spaced-apart glue droplets 12 on the top side edge 13 of the wood strips. These applicators are provided with dispensing nozzle 29' as better illustrated in FIG. 10. After the glue droplets are applied the transport circular discs 39 are caused to rotate to position the next wood strip, held by the transport circular discs 39, in position under the applicators 29. Meanwhile, the previous wood strip with the glue droplet is displaced towards a transfer mechanism 30 which consists of a pair of transfer discs 31 also secured on a driven shaft or axle 43 which is drivingly coupled to the driven axle 40 of the transport circular discs 39'.

The transfer discs 31 are disposed in spaced relationship with the transport circular discs 39' whereby transfer teeth 44 formed in the outer periphery of the transfer wheels progressively engaged the wood strip having the glue droplets disposed thereon and transfers it from the transport circular discs to a feed mechanism 45 which transfers the wood strip to an input end 31' of a conveyor 32 where said wood strips are accumulated in predetermined quantity and disposed with their longitudinal side edges to be in contact with one another and interconnected by the glue droplets. Accordingly, the wood strips interconnect by their glue droplets at the input end of the conveyors 32.

Referring to FIG. 11, there is shown the construction of the feed mechanism 45. The feed mechanism comprises a support frame 45' on which are secured two pairs of feed arms 48 and 48' which are mounted on respective linear guide tracks 49 and 49' and are displaced in a reciprocating motion with respect to one another. As hereinshown, the feed arms 48' are wider than the feed arms 48 which are displaced inside the outer feed arms. Each feed arm is equipped with a pusher finger 46 and 46' to engage a wood strip from the transfer wheels 30 to discharge the wood strips from the wheels and push them over a straight guide support 50' and onto a feed chain 46'' disposed at opposed ends of the input end 31' of the conveyor. These feed arms are operated at high speed to ensure the proper discharge of the wood strips 11 from the transfer discs 31. A motor 47, operated by the controller 9, drives timing belts 47' to operate the feed arms in reciprocating motion to ensure controlled spacing. Accordingly, the wood strips 11 stack-up to a predetermined quantity at the input end 31' of the conveyor 52 and the glue droplets interconnect the opposed side edges of the accumulated wood strips together.

Referring to FIGS. 6, 7 and 12 there is shown the construction of the conveyor 32. The conveyor has a support platform 50 to which is secured a bottom belt conveyor 51 displaceable over a vertically oriented flat support plate 50''. A top belt conveyor 52 is displaceable above the bottom belt conveyor to form a transport gap 53 therebetween. Two or more pressure plates, herein a plurality of pressure plate 34 are disposed transversely behind the top belt conveyor to apply pressure to a top side of the wood strips interconnected in spaced relationship and conveyed by the bottom and top belt conveyors along the transport gap 53 over the support plate 50' to prevent deformation of the wood strips.

The bottom and top belt conveyors 51 and 52 are comprised of two or more belt conveyors, herein four, constructed of a flexible glue release material such as silicon, whereby not to adhere to the glue droplets. The belt conveyors are aligned with the glue droplets to squeeze any glue droplets exceeding the top and bottom surface of the wood strips. The top and bottom belt conveyors are vertically and longitudinally aligned with one another and transversely spaced for alignment with the glue droplets which interconnect the wood strips. They are driven in synchronism.

The pressure plates 54 are adjustable pressure plates whereby to set a desired pressure on the wood strips within the transport gap 53 and to adjust for the thickness of the wood strips. Also the conveyors are of a sufficient length to permit the glue droplets to cool down to the point that they apply sufficient mechanical resistance to maintain the wood strips interconnected to one another along their opposed side edges and maintain a substantially constant spacing between the wood strips.

The conveyor belts are herein shown trained about driving idle rolls with the idle roll assembly 56 and 56' being adjustable to apply tension on the belt conveyors to provide sufficiently tension and traction force to maintain the strips in position along the transport gap 53.

As can be better seen in FIG. 6, the exit end 36 of the machine is provided with devices to apply a further means of retention of the wood strips interconnected by glue droplets. This means of retention can be, for example, the application of a tread or band of flexible polyester fibers impregnated with glue and applied on the top surface of the assemble wood strips exiting the conveyor. As hereinshown, the machine is equipped with two glue tape applicators 35 which applies the retention strips 14, as illustrated in FIG. 1.

Figure 8:
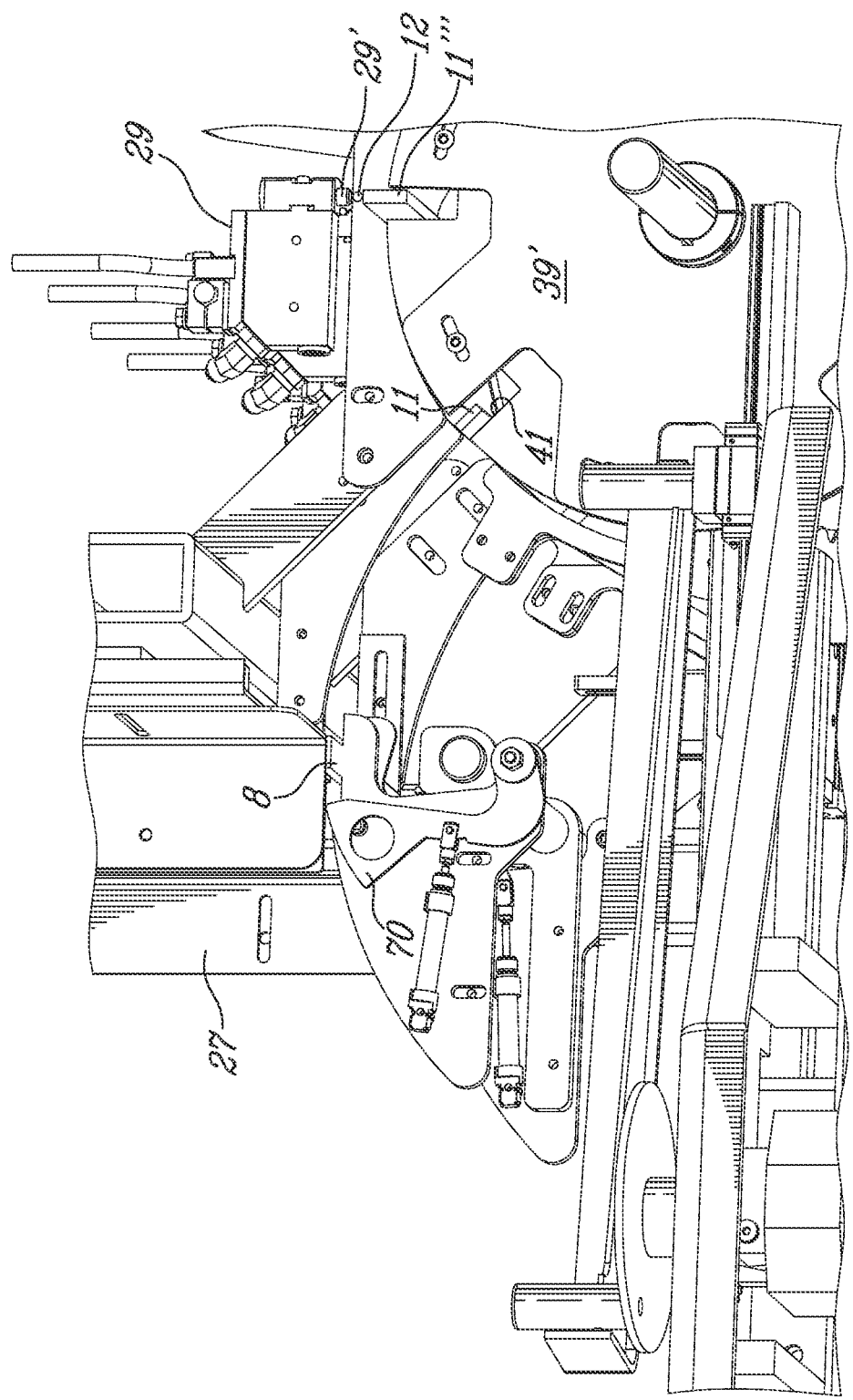
FIG. 8 is a perspective and fragmented side view showing the loading end of the machine and the transfer of the wider wood strips to the transporter for the delivery of the wood strips to the thermofusable glue droplet application station.

As previously described in the fabrication of engineered wood boards, it is common that the wood boards be provided with a wider wood strip at opposed end of the wood board whereby interconnecting joint can be formed therein, such as a lap joint or tongue and groove joint. The machine 25 of the present invention provides for this wider board at the inlet feeding mechanism 26 which is equipped with a magazine 27 whereby to store wood strips of wider dimension. These wood strips are disposed in the machine at specific locations whereby to lie at the ends of the quality wood sheets disposed thereon whereby to effect a connecting joint. The insertion of these wider wood strips is programmed in the computer of the controller 9. As shown in FIG. 8, the wider wood strips, herein wood strips 8 are discharged from the bottom end of the magazine 27 by a pivoting positioner 70 which transfers the wood strips 8, in a guided fashion, at the bottom of the magazine 27 and into a vacant one of the transport slots 41 of the transport disc 39'. In order to have a vacant slot 41 at that location the feed conveyor 38 has a pressure plate 37 which is actuable to retain the wood strips at the feed end of the feed conveyer immediately in front of the transport circular disc 39'. Two of these wider wood strips are fed in sequence to define an end of a strip of flexible wood strips completed and the beginning of a next strip. The controller will stop the operation of the wood strip feeding assembly whereby to create a space between the already completed wood strips sheet and the next one to be formed if it is desired to have a space therebetween. Otherwise, the sequence will continue with the sheets abutting one another.

Briefly, the method for the fabrication of the sheet of wood strips of the present invention will now be described.

The method generally comprises providing a plurality of elongated wood strips 11 having similar dimensions. These wood strips are fed in a predetermined orientation to a transporter mechanism 28. The wood strips are oriented with a longitudinal side edge thereof to receive deposits of two or more spaced-apart glue droplets thereon under a glue droplets applicator which may be provided with two or more dispensing nozzles whereby to apply two or more spaced-apart glue droplets along the longitudinal side edge of the wood strips. The method further comprises transferring the wood strips with the glue droplets to an input end of a conveyor where the wood strips are disposed side-by-side and interconnect in space relationship along opposed side edges thereof by the glue droplets.

The method further comprises conveying the wood strips interconnected in spaced relationship from opposed top and bottom surfaces thereof. Pressure is applied across the wood strips to prevent warping and displacement of the wood strips and to press any of the glue droplets projecting above the bottom surfaces of the wood strips. The conveyors are of sufficient length whereby to permit the glue droplets to dry along the conveyor to provide sufficient retention force of the glue droplets to retain the wood strips interconnected in spaced-apart relationship to form a flexible sheet of wood strips. As shown in FIG. 3, the glue droplets provide for the flexion between adjacent wood strips.

It is pointed out that the step of providing a plurality of elongated wood strips comprises storing a plurality of wood strips, and manually positioning the wood strips on the feed conveyor 38. The step of orienting the longitudinal side edge of the wood strips to receive the glue droplets as herein-shown is comprised by a transporter which receives wood strips in slots and orients the wood strips to a vertical position under glue applicators to receive glue droplets and then transfers the wood strips to the transfer wheels 30. The transfer wheels are disposed in spaced relationship to one another on a drive axle and driven in synchronism with the circular disc 39 of the transporter whereby to transfer the wood strips to a feed mechanism which transfers the wood strips to the input end 31' of the conveyor 32 where they are continuously assembled. The conveyor engages the top and bottom surfaces of the wood strips by the belt conveyors whereby the wood strips are conveyed in a transport gap and under the pressure plates where pressure is applied to prevent the wood strips from deforming.

Also a loading magazine is provided to store wider wood strips which are inserted in the assembly at predetermined locations to form the outer ends of the sheet of wood strips to receive routed interconnection grooves.

It is within the ambit of the present invention to cover any obvious modifications of the preferred embodiments described herein provided such modifications fall within the scope of the appended claims. It is also contemplated that the flexible sheet of wood strips 10 may be used for the fabrication of flexible engineered wood sheets which would be comprised of a thin top wood sheet fabricated from a quality wood material glued to a surface of the sheet of wood strips. The wood strips extend transverse to the grain direction of the top wood sheet. This would provide a sheet which has longitudinal flexibility or flexibility in the grain direction with the wood strips also providing for dimensional stability of the flexible engineered wood strips.

The invention claimed is:

1. An engineered floor board comprising a top wood sheet of wood glued to a surface of a flexible sheet of wood strips, said wood strips being elongated wood strips of rectangular cross-section held together in a side-by-side aligned spaced relationship by thermofusable glue droplets, the thermofusable glue droplets being spaced longitudinally apart from one another along flat, opposed side edges of said wood strips, all having the same width between said opposed side edges and collectively interconnecting said wood strips to one another between said opposed side edges in a manner providing a constant spacing between the wood strips, the thermofusable glue droplets all having the same width between said opposed side edges collectively forming a flexible joint providing flexibility to said flexible sheet of wood strips, the thermofusable glue droplets providing a mechanical retention force to retain the wood strips in an interconnected spaced-apart relationship, a gap being defined between interconnected opposed side edges, the gap having a constant width between said opposed side edges and being regularly intersected by said thermofusable glue droplets, said wood strips having a longitudinal axis thereof disposed transverse to a grain orientation axis of said top wood sheet to provide flexibility of said top wood sheet along said grain orientation axis and dimensional stability to said engineered floor board.

2. A flexible sheet of wood strips, said wood strips being elongated wood strips of rectangular cross-section held together in a side-by-side aligned spaced relationship by thermofusable glue droplets, the thermofusable glue droplets being spaced longitudinally apart from one another along flat, opposed side edges of said wood strips, all having the same width between said opposed side edges and collectively interconnecting said wood strips to one another between said opposed side edges in a manner providing a constant spacing between the wood strips, the thermofusable glue droplets all having the same width between said opposed side edges collectively forming a flexible joint providing flexibility to said flexible sheet of wood strips, the thermofusable glue droplets providing a mechanical retention force to retain the wood strips in an interconnected spaced-apart relationship.

3. The flexible sheet of wood strips as claimed in claim 2 wherein said wood strips are formed from resinous wood.

4. The flexible sheet of wood strips as claimed in claim 2 wherein some of said wood strips are of a wider dimension, said wood strips of wider dimension being positioned at positions along said sheet of wood strips whereby to lie adjacent end edges of said flexible sheet.

5. The flexible sheet of wood strips as claimed in claim 2, wherein there is further provided a flexible tread to provide retention of said wood strips interconnected by said glue droplets in said flexible sheet.

6. The flexible sheet of wood strips as claimed in claim 5 wherein said flexible tread is constituted by two or more flexible treads of fiber material secured to an outer face of each said wood strips of said sheet of wood strips and disposed spaced-apart from one another along said flexible joints to retain said wood strips in said aligned spaced relationship.

7. The flexible sheet of wood strips as claimed in claim 6 wherein said flexible treads of fiber material are polyester fibers impregnated in glue band coatings disposed across said outer face of said wood strips transversely thereto.

* * * * *